Figure 5:
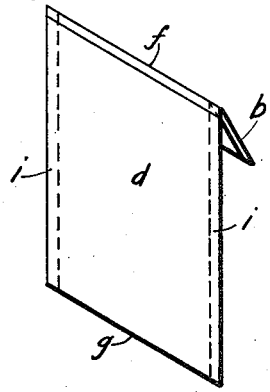

B. B. AVERY.
DRINKING CUP.
APPLICATION FILED AUG. 6, 1917.
1,341,831.
Patented June 1, 1920.
2 SHEETS—SHEET 1.
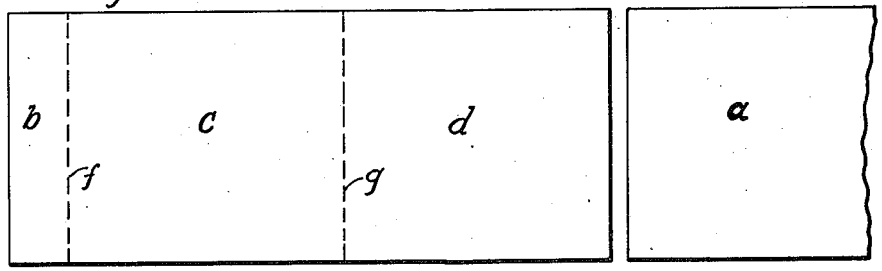
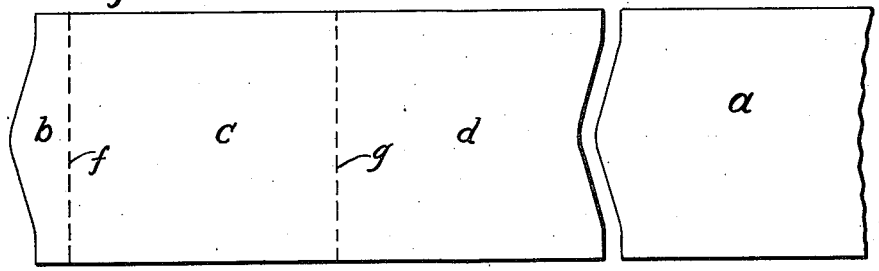
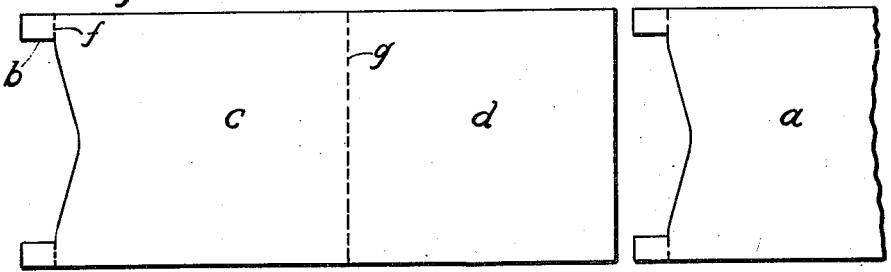
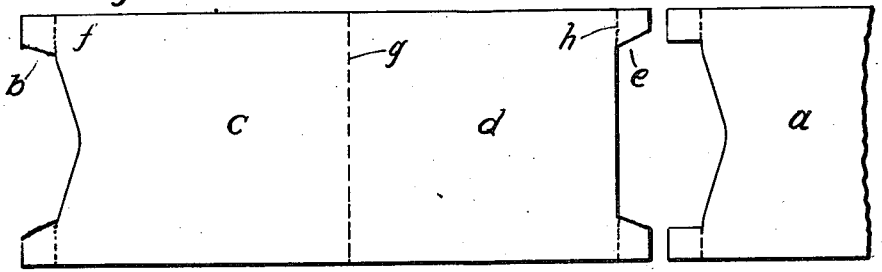
WITNESSES
INVENTOR
Benjamin B. Avery
BY
ATTORNEY

B. B. AVERY.
DRINKING CUP.
APPLICATION FILED AUG. 6, 1917.

1,341,831.

Patented June 1, 1920.

2 SHEETS—SHEET 2.

WITNESSES

INVENTOR
Benjamin B. Avery
BY
ATTORNEY

UNITED STATES PATENT OFFICE.

BENJAMIN B. AVERY, OF NEW YORK, N. Y., ASSIGNOR, BY MESNE ASSIGNMENTS, TO GERMPROOF CUP CORPORATION, OF NEW YORK, N. Y., A CORPORATION OF NEW YORK.

DRINKING-CUP.

1,341,831.          Specification of Letters Patent.          Patented June 1, 1920.

Application filed August 6, 1917. Serial No. 184,563.

*To all whom it may concern:*

Be it known that I, BENJAMIN B. AVERY, a citizen of the United States, residing at New York city, in the county of New York and State of New York, have invented certain new and useful Improvements in Drinking-Cups, of which the following is a specification.

This invention relates to sanitary drinking cups, the object of the invention being to provide a cup which can be readily, quickly, simply and inexpensively made with a minimum quantity of material so that it may be discarded after it is once used.

I am aware that it is not new to provide a drinking cup from a folded blank having its longitudinal edges folded a plurality of times, so as to form a cup, which form of cup is shown in the Powers Patent No. 1,107,347 owned by my company, but the primary object of my invention, however, is to improve that cup and so lock the folded edges that they will not become separated in use, which is not provided against in the Powers cup, and this I accomplish in various ways hereinafter referred to.

Figure 6:
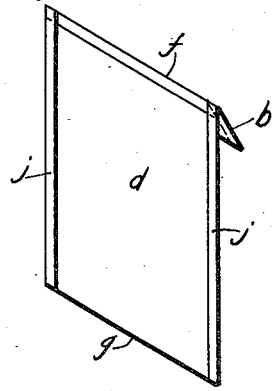
Figure 7:
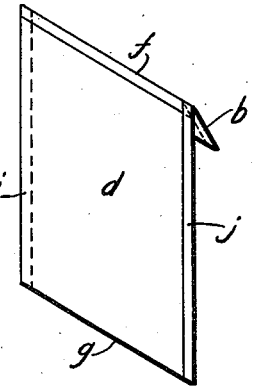
Figure 8:
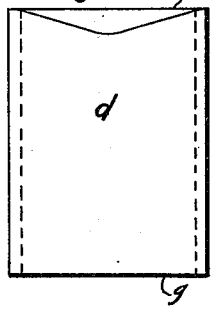
Figure 9:
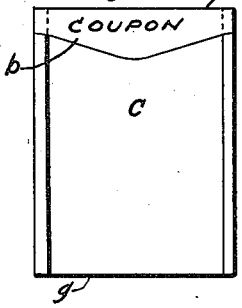
Figure 10:
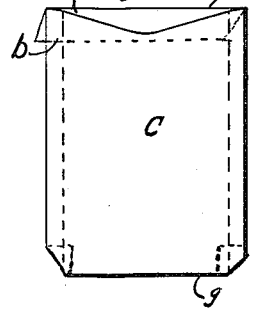
Figure 11:
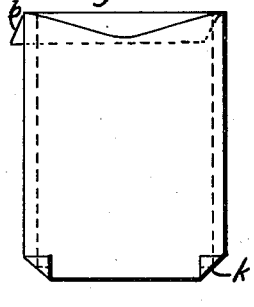

In the drawings accompanying and forming a part of this specification,

Figures 1, 2, 3 and 4 illustrate different forms of blanks from which the cup can be made; Figs. 5, 6 and 7 illustrate perspective views of the cup made from the blank shown in Fig. 1; Figs. 8 and 9 illustrate cups made from the blank shown in Fig. 2; Figs. 10 and 11 illustrate cups which may also be made from a blank similar to that shown in Fig. 2. Figs. 12, 13, 14 and 15 illustrate cylindrical cups which may be made from the style of blank shown in Fig. 4.

Similar letters of reference indicate corresponding parts in the several figures of the drawings.

In the various forms of cups shown, however, the folded side edges are so locked that the separation thereof is practically prevented, which as hereinbefore stated, is the primary object of the present improvement.

In the present improvement any desired number of cups may be produced successively from a long web of paper by simply cutting therefrom rectangular blanks and folding them in the manner about to be described.

In making the cups shown in Figs. 5, 6 and 7, each cup blank cut from a web of paper $a$ is of sufficient length to form two sides $c$ and $d$, and a flap $b$. The sides are folded midway of their length as at $g$, which sides are then folded lengthwise of their length as at $i$ to form a plurality of folds one inside another. In some cases these folds may be toward each other on one side of the cup as shown in Fig. 5, in other cases they may be on the other side as shown in Fig. 6, or they may be on opposite sides as shown in Fig. 7. It is believed, however, that the form of cup illustrated in Fig. 5 is much the preferable construction. When the cup is folded as just described, the flap $b$ is then folded down along the line $f$ over one side of the cup as illustrated in Figs. 5, 6 and 7, whereupon the side folds are locked practically against separation. This locking flap $b$ not only forms a locking means for the side folds, but it also constitutes a reinforced edge for the cup as well as a thickened edge for the lips of the user. In other words, the overlapping of this flap $b$ provides a rounded edge for the lips of the user and prevents any tendency of the sharp edge of the cup from cutting the lips.

In the form of cup shown in Figs. 8 and 9, the flap $b$ is of curved form as illustrated in the blank shown in Fig. 2, it being like the flap $b$ shown in Figs. 5, 6 and 7 bent down along the line $f$ to lock the side edges. In Fig. 8 the side edges are folded in the manner shown in Fig. 5, while in Fig. 9 the side edges are folded in the manner shown in Fig. 6. In Figs. 10 and 11, in addition to the flap $b$, the side edges are locked at the lower edges by turning the lower corners of the cup in the manner indicated at $k$. In Fig. 10 these corners are illustrated as turned in one direction, while in Fig. 11 they are illustrated as turned in the opposite direction. The corners form an additional locking means, but not as efficient as the flap $b$ of Figs. 5, 6 and 7.

Figure 12:
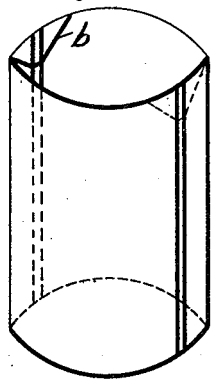
Figure 13:
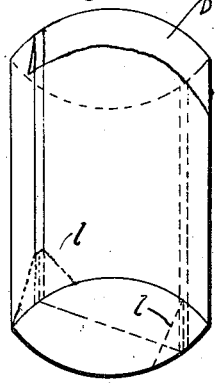
Figure 14:
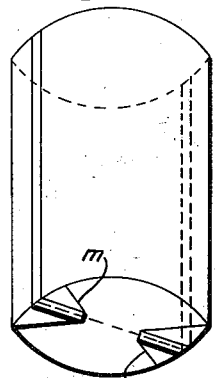
Figure 15:
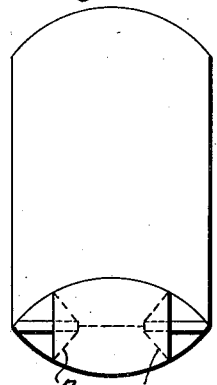

Figs. 12, 13, 14 and 15 illustrate cylindrically formed cups formed from blanks, such as that illustrated in Fig. 4, in which each side $c$ and $d$ is provided with a pair of extensions or separated flaps $b$ and $e$, which when the cup is formed as shown in Fig. 12 with their side edges folded, are turned inwardly as illustrated at $b$ in Fig. 12 although they may be turned outwardly. In this form of cup instead of a continuous flap $b$, it will be observed that a pair of inturned flaps are provided. In Fig. 13 the lower folded edges of the cup are folded inwardly and upwardly as at $l$ along the sides of the cup, while in Fig. 14 they are folded inwardly toward each other at $m$ along the bottom of the cup. In Fig. 15 the flaps may be folded in the manner shown at $n$, that is, inside instead of outside the cup. In Figs. 13, 14 and 15 it will be understood that the upper flap $b$ shown in Figs. 5, 6 and 7 may also be used in addition if desired to the lower flaps $l$, $m$ and $n$, or the style of flap $b$ of Fig. 12 may be used in addition to the lower flaps $l$, $m$ and $n$. In all the forms of the cup shown, it will be observed that I have provided an efficient locking means for locking the side edges against detachment, which locking means may be formed at either end of the cup or at both ends when preferred, but in practice I have found that the simplest and most easily folded form of locking means is that shown in Figs. 5, 6, 7, 8 and 9. In practice the locking flap $b$ may be in the form of a coupon if desired.

In practice, the cup may be made liquid-proof by the use of paraffin paper, or by coating paper with paraffin or other suitable substance, and this may be helpful in preserving the edges of the paper as well as securing the locking flap in position, although the improvement is not confined thereto.

As shown in Figs. 5, 6, 7, 8 and 9 in the present improvement, when the side edges of the cup are infolded in the manner shown, particularly in the preferred form of cup shown in Figs. 5, 6, 7, 8 and 9, these same folds extend across the flap $b$ so that when the flap is bent down the infolded portions are bent upon themselves at the crease formed by the bending of the flap $b$ thereby materially assisting in preventing the infolded side edges from becoming separated.

I claim as my invention:

1. A sanitary drinking cup comprising a blank folded upon itself transversely thereby to form a pair of flat sides, one of said sides having a flap extending beyond the other at the open end of the cup, said sides and flap having their side edges folded and refolded, and the flap with its folded side edges folded down upon the cup thereby to lock the side folds thereof.

2. A sanitary drinking cup comprising a blank folded upon itself transversely thereby to form a pair of flat sides, one of said sides having a flap extending beyond the other at the open end of the cup, said sides and flap having their side edges folded and infolded, and the flap with its folded side edges folded down upon the cup thereby to lock the side folds thereof.

3. A sanitary drinking cup comprising a blank folded upon itself transversely thereby to form a pair of flat sides, one of said sides having a flap extending beyond the other at the open end of the cup, said sides and flap having their side edges folded and refolded to lock the same without the use of paste, and the flap with its folded side edges folded down upon the cup thereby to lock the side folds thereof, said cup also having folded bottom portions with both folded side edges thereof folded therewith.

Signed at 1822 Park Row Bldg., New York city, N. Y., this 3rd day of August, 1917.

BENJAMIN B. AVERY.